United States Patent [19]

Reese et al.

[11] 4,087,578
[45] May 2, 1978

[54] HEAT SEALABLE SHEET MATERIALS

[75] Inventors: Eckart Reese, Dormagen-Hackenbroich; Joachim Wank, Zons, both of Germany

[73] Assignee: Bayer Aktiengesellschaft, Leverkusen, Germany

[21] Appl. No.: 637,723

[22] Filed: Dec. 4, 1975

Related U.S. Application Data

[62] Division of Ser. No. 468,801, May 10, 1974, abandoned.

[30] Foreign Application Priority Data

May 16, 1973 Germany .............................. 2324715

[51] Int. Cl.$^2$ ............................................. C09J 7/02
[52] U.S. Cl. .................................... 428/216; 428/421
[58] Field of Search ............... 427/207; 428/262, 349, 428/421, 216

[56] References Cited

U.S. PATENT DOCUMENTS

| | | | |
|---|---|---|---|
| 3,395,038 | 7/1968 | Lucchetti | 117/122 |
| 3,397,079 | 8/1968 | DePugh | 117/122 |
| 3,397,253 | 8/1968 | Merten et al. | 260/830 |
| 3,483,023 | 12/1969 | Dotson et al. | 117/122 |
| 3,488,211 | 1/1970 | Morrison et al. | 117/122 |
| 3,532,533 | 10/1970 | Ackerman | 117/122 |
| 3,730,823 | 5/1973 | Veneziale | 117/122 |
| 3,769,150 | 10/1973 | King et al. | 117/122 X |

FOREIGN PATENT DOCUMENTS 1,140,961   1/1969   United Kingdom.

*Primary Examiner*—Bernard D. Pianalto
*Attorney, Agent, or Firm*—Connolly and Hutz

[57] ABSTRACT

Heat sealable temperature-resistant sheet material wherein a solution of a partially fluorinated high-molecular weight aliphatic hydrocarbon with a molecular weight of 1,000 to 500,000 which is solid at room temperature in a solvent mixture of (a) 10 to 60 volume percent of at least one chlorinated aliphatic hydrocarbon containing 1 to 6 carbon atoms and having a boiling point of 30° to 150° C and (b) 40 to 90 volume percent of at least one alkyl ester of a polybasic aromatic carboxylic acid or at least one high-boiling ketone is applied to a temperature-resistant plastics sheet and the solvent is removed.

4 Claims, No Drawings

HEAT SEALABLE SHEET MATERIALS

This application is a division of application Ser. No. 468,801 filed May 10, 1974 and now abandoned.

It is known that high temperature resistant plastics sheets, for example polyimide sheets coated with fluorinated hydrocarbons which are solid at room temperature are capable of being heat-sealed. The layer of fluorinated hydrocarbons is generally produced by laminating the temperature-resistant sheet to a sheet of the fluorinated hydrocarbon at a temperature above the softening point of the fluorinated hydrocarbon. Another method consists of applying the fluorinated hydrocarbon in the form of a powder to the temperature-resistant sheet and then fixing the powder by sintering. Attempts have also been made to dissolve the fluorinated hydrocarbon in high boiling solvents, to apply the solution to the temperature-resistant sheet and then evaporate the solvent. This method requires high drying temperatures and long drying times and the finished sheet must be finally tempered at temperatures above 200° C. Furthermore, additives must be added to the solution of fluorinated hydrocarbon to improve film-formation. These additives must be completely removed with the solvent or at the tempering stage. The formation of a perfect coating by this method is difficult and very complicated.

This invention relates to a new process for producing temperature-resistant sheet materials which are capable of being heat-sealed, using a coating of fluorinated hydrocarbons, wherein a solution of a partially fluorinated, high-molecular weight aliphatic hydrocarbon with a molecular weight of 1000 to 500,000 which is solid at room temperature, a solvent mixture of (a) 10 to 60 volumes percent of a chlorinated aliphatic hydrocarbon containing 1 to 6 carbon atoms and having a boiling point of 30° – 150° C and (b) 40 – 90 volumes percent of an alkyl ester of a polybasic aromatic carboxylic acid or high boiling ketones is applied to a temperature-resistant plastics sheet and the solvent is removed.

Preferred solvent mixtures are those which at least at their boiling point are capable of swelling the temperature-resistant sheet and thus producing a firm bond between the temperature-resistant sheet and the layer of fluorinated hydrocarbon.

The solvent mixtures used for dissolving the fluorinated hydrocarbons generally consist of 10 to 60 volumes percent of a low-boiling chlorinated hydrocarbon which contains 1 to 6 carbon atoms and 40 to 90 volumes percent of an alkyl ester of a polybasic aromatic carboxylic acid or high-boiling ketones.

Low-boiling chlorinated hydrocarbons which have a boiling point between 30° and 150° C is 1,1,1-trichloroethane.

Suitable alkyl esters of polybasic aromatic carboxylic acids, preferably of di-, tri- or tetracarboxylic acids, are, for example, $C_1 - C_{18}$ alkyl esters of phthalic acid, trimellitic acid and benzene tetracarboxylic acid. Dimethyl phthalate, dioctyl phthalate and phorone are particularly suitable. The solution of fluorinated hydrocarbons in such solvent mixtures generally contains 10 to 25% of fluorinated hydrocarbons.

Suitable high boiling ketones are those having a boiling point between 80° and 250° C, such as aliphatic ketones containing from 5 to 11 carbon atoms, preferably phorone, aliphatic aromatic ketones containing from 7 to 13 carbon atoms, preferred phenoxy acetone, or aromatic ketones containing 7 to 13 carbon atoms, preferred diphenyl ketone.

A most preferred solvent mixture consists of 10 to 60 volume percent of 1,1,1-trichloroethane and of 40 to 90 volume percent of dimethylphthalate.

Fluorinated hydrocarbons which are particularly suitable for the coating are high-molecular weight aliphatic compounds with molecular weights of about 1000 to about 500,000. Preferably 25 – 75% of the hydrogen atoms are replaced by fluorine. Up to 10% of the hydrogen atoms which are capable of being substituted may also be substituted with other substituents which are stable at the reaction temperature, for example chlorine. The fluorinated hydrocarbons must be solid at room temperature.

Particularly suitable fluorinated hydrocarbons are fluorinated ethylene-propylene copolymers with a molecular weight of about 1000 to about 500,000 which are composed of about 80 to 20% by weight of ethylene units and 20 to 80% by weight of propylene units and in which 25 to 75% of the hydrogen atoms are substituted with fluorine. Polyvinylidene fluorides with a molecular weight of about 1000 to about 10,000 are also particularly suitable.

The basic material used may in principle be any high-temperature resistant plastics sheet. Polyhydantoin sheets are particularly suitable. Polyhydantoins are already known. They may be prepared, for example, by reacting aromatic diglycine esters with diisocyanates. A typical example is the reaction of N,N'-bis-carbethoxymethyl-4,4'-diamino-diphenylmethane with 4,4'-diisocyanatodiphenylmethane. Polyhydantoins and methods of preparing them have been described, for example, in U.S. Pat. No. Specification No. 3,397,253.

To carry out the process, a sheet is produced from a temperature-resistant synthetic resin, preferably a polyhydantoin. The thickness of the sheet is generally about 5 to about 200 μ. The solution of fluorinated hydrocarbon in the above described solvent mixture is applied to this sheet and the solvent is evaporated. The quantity of solution applied is calculated to produce a coating with a thickness of preferably 2 to 30 μ. The solution of fluorinated hydrocarbons may be applied by any known methods, preferably by means of a roll coater or doctor knife. Temperatures of about 120° – 200° C are in most cases required for evaporating the solvent.

Another object of this invention is polyhydantoin sheet with a thickness of about 5 to about 200 μ which carries a coating about 2 to about 30 μ in thickness which is firmly bonded to the sheet and which consists of a partially fluorinated high-molecular weight aliphatic hydrocarbon with a molecular weight of 1000 to 500,000. This sheet material is suitable in particular for use as an electro-insulating sheet. Coated sheets of other high-temperature resistant plastics are also suitable for this purpose but coated polyhydantoin sheets are preferred because they have an exceptionally high electrical insulation value and exceptionally high break-down voltage. In addition, their mechanical strength is exceptionally high. The polyhydantoin sheets coated with fluorinated hydrocarbons according to the invention are used particularly for insulating flat copper conductors. They are wound spirally round such conductors and then sealed by heat. Flat copper conductors of this kind are used for the field winding of high power electric motors, e.g. with outputs of over 100 kilowatt.

EXAMPLE 1

An ethylene-propylene copolymer with a molecular weight of about 50,000 which is composed of 50% ethylene units and 50% propylene units and in which half the hydrogen atoms which are capable of being substituted are replaced by fluorine atoms is dissolved in a mixture of 50 parts by volume of 1,1,1-trichloroethane and 50 parts by volume of dimethyl phthalate at temperatures of 50° – 60° C to form a 10% by weight solution. The filtered solution is coated by spreading on a polyhydantoin sheet 20 – 30 $\mu$ in thickness to form on it a layer with a thickness of about 100 $\mu$. The coated sheet is dried in hot air at about 150° C.

The coated polyhydantoin sheet obtained in this way carries a fluorinated hydrocarbon layer 10 $\mu$ in thickness which adheres so firmly to the polyhydantoin sheet that the strength of the bond is greater than the tear resistance of the fluorinated hydrocarbon layer.

The coated sheet is wound spirally round a flat copper conductor and sealed by heating to 250° – 300° C. The insulated flat conductor obtained in this way can be twisted spirally without the insulating layer becoming detached.

EXAMPLE 2

Example 1 is repeated except that a polyvinylidene fluoride with a molecular weight of about 1000 is used instead of the fluorinated ethylene-propylene copolymer. Here again the insulation obtained on the flat copper conductor is not detached by twisting.

We claim:

1. A heat sealable sheet material comprising a hydantoin sheet having a coating firmly bonded thereto, said coating consisting essentially of a partially fluorinated high molecular weight aliphatic hydrocarbon having a molecular weight of 1,000 to 500,000.

2. The heat sealable sheet material of claim 1 wherein said polyhydantoin sheet is of a thickness of about 5 to about 200$\mu$ and said coating is of a thickness of about 2 to about 30$\mu$.

3. The heat sealable sheet material of claim 1 wherein the partially fluorinated hydrocarbon is a fluorinated ethylene-propylene copolymer.

4. The heat sealable sheet material of claim 1 wherein the partially fluorinated hydrocarbon is a polyvinylidene fluoride.

* * * * *